W. C. BAXTER.
BELT KNIFE SPLITTING MACHINE.
APPLICATION FILED JUNE 27, 1919.

1,382,755.

Patented June 28, 1921.
8 SHEETS—SHEET 1.

INVENTOR
William C. Baxter

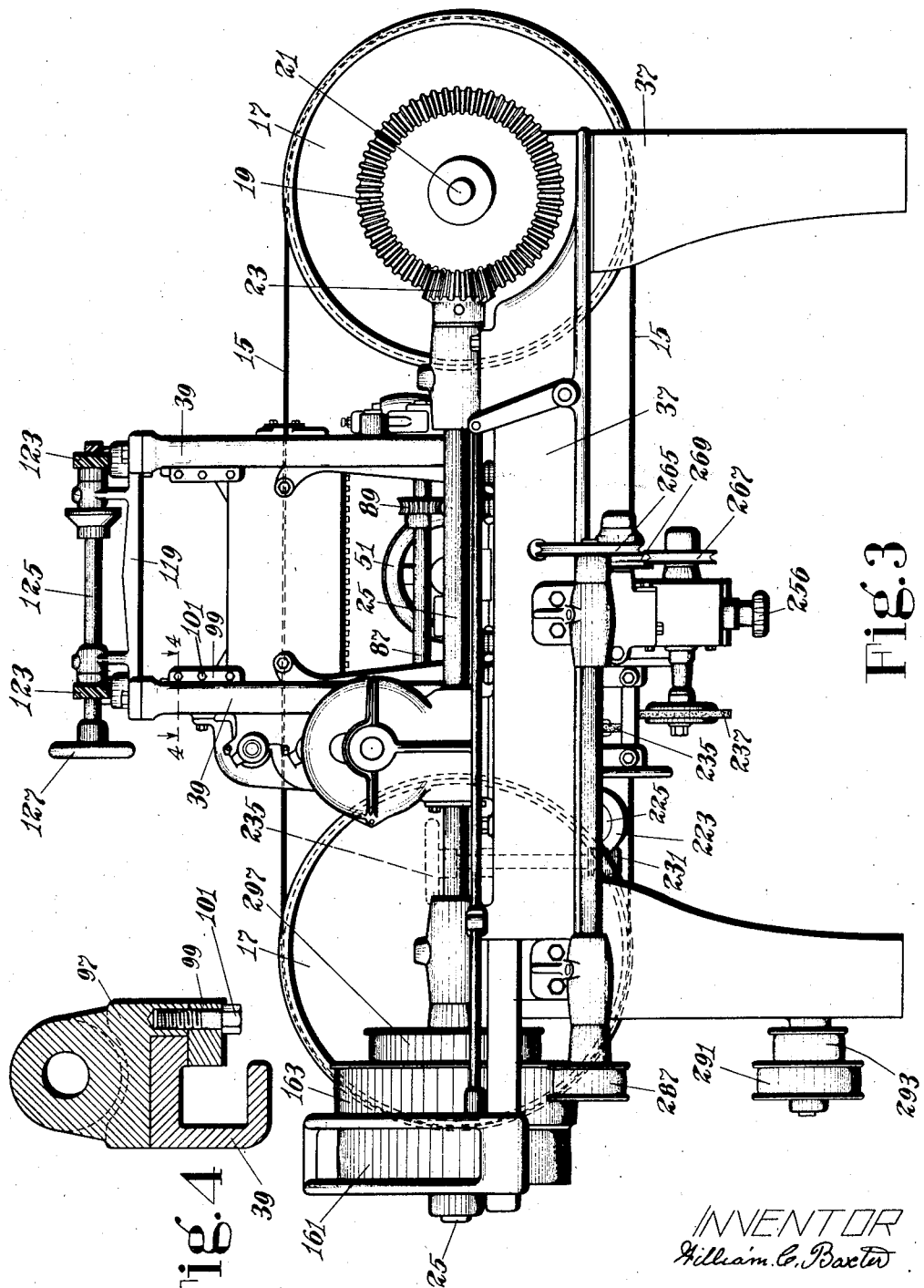

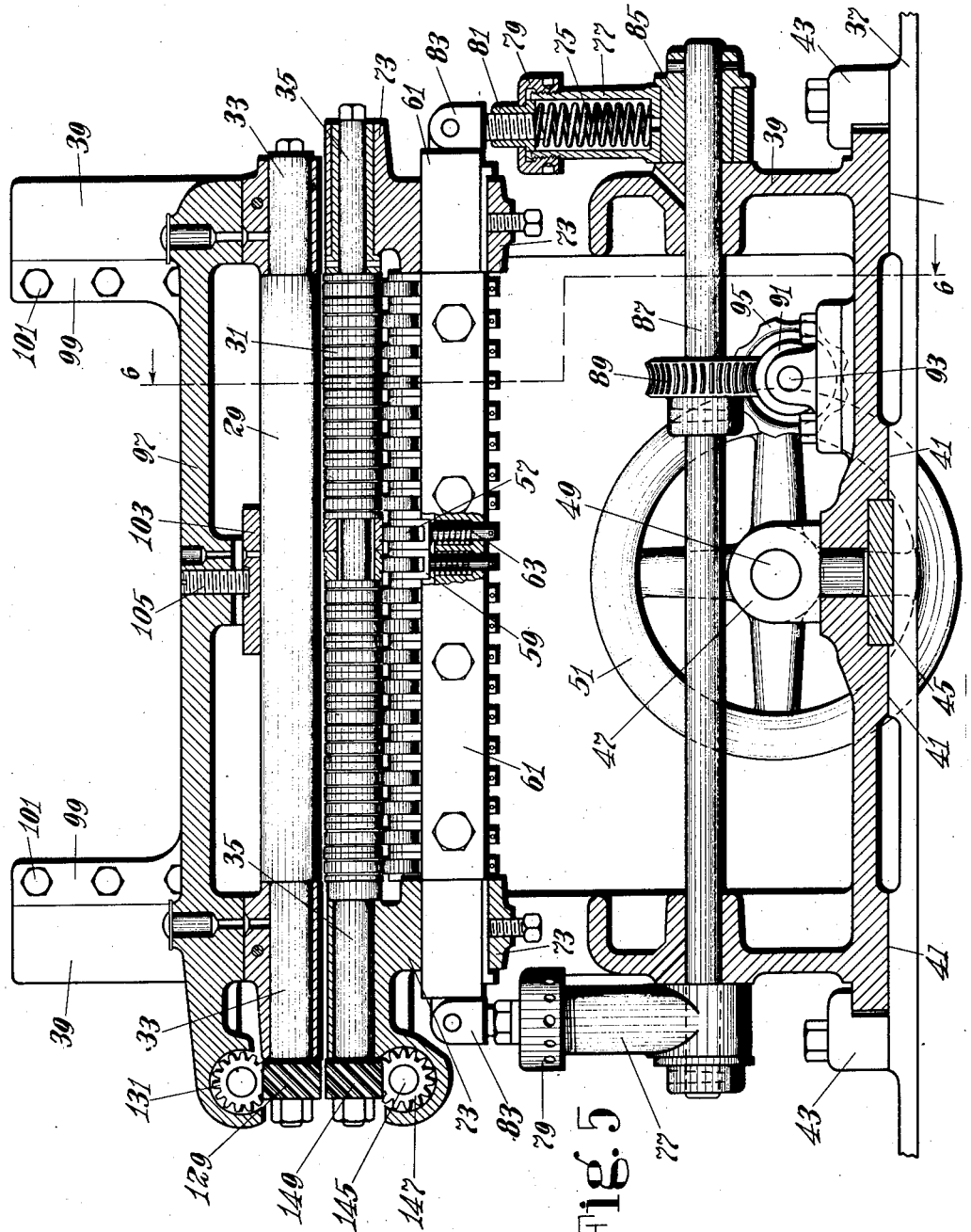

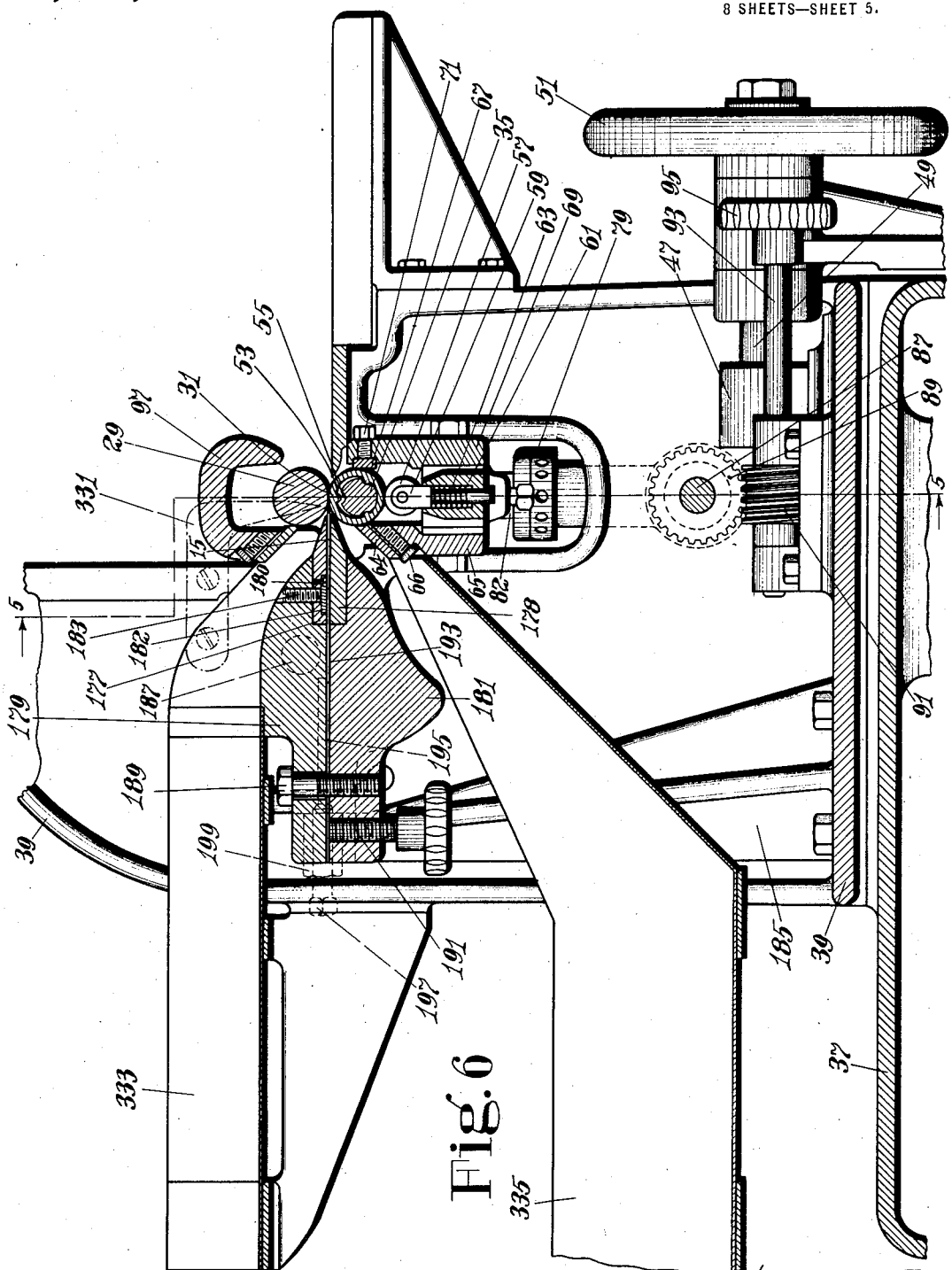

W. C. BAXTER.
BELT KNIFE SPLITTING MACHINE.
APPLICATION FILED JUNE 27, 1919.

1,382,755.

Patented June 28, 1921.
8 SHEETS—SHEET 6.

INVENTOR
William C. Baxter

W. C. BAXTER.
BELT KNIFE SPLITTING MACHINE.
APPLICATION FILED JUNE 27, 1919.

1,382,755.

Patented June 28, 1921.
8 SHEETS—SHEET 7.

INVENTOR
William C. Baxter

W. C. BAXTER.
BELT KNIFE SPLITTING MACHINE.
APPLICATION FILED JUNE 27, 1919.

1,382,755.

Patented June 28, 1921.
8 SHEETS—SHEET 8.

INVENTOR
William C. Baxter

UNITED STATES PATENT OFFICE.

WILLIAM C. BAXTER, OF BEVERLY, MASSACHUSETTS, ASSIGNOR TO UNITED SHOE MACHINERY CORPORATION, OF PATERSON, NEW JERSEY, A CORPORATION OF NEW JERSEY.

BELT-KNIFE SPLITTING-MACHINE.

1,382,755.  Specification of Letters Patent.  Patented June 28, 1921.

Application filed June 27, 1919. Serial No. 307,093.

*To all whom it may concern:*

Be it known that I, WILLIAM C. BAXTER, a citizen of the United States, residing at Beverly, in the county of Essex and State of Massachusetts, have invented certain Improvements in Belt-Knife Splitting-Machines, of which the following description, in connection with the accompanying drawings, is a specification, like reference characters on the drawings indicating like parts in the several figures.

This invention relates to splitting machines and is herein illustrated as embodied in a leather splitting machine having a belt knife.

Splitting machines of this type commonly comprise a pair of rolls for feeding the work to the belt knife, the cutting edge of which is located as closely as possible to the bite of the rolls. It is important that the proper relative position of the knife with respect to the rolls be maintained, as well as that the knife should be ground frequently in order to keep it extremely sharp. In practice it is customary to grind the knife continuously by maintaining the grinders lightly in contact with it. This continuous grinding wears away the edge of the knife and necessitates frequent adjustments of the relative position of the knife and rolls. In the illustrative machine the knife and drums are fixed so far as adjustment toward and from the bite of the feed rolls is concerned; and the feed rolls are mounted in bearings in a head which may be adjusted in a path substantially parallel to the plane of the cut of the knife to secure the proper position of the bite of the rolls with respect to the edge of the knife. The adjustment of the knife and drums as formerly practised is thus done away with, and the liability which then existed that the drums might not be adjusted exactly the same distance is obviated. Moreover, the adjustment of the head is compelled to take place without deviation always in a path at right angles to the edge of the operative run of the knife so that said edge is always parallel to the bite of the rolls.

In belt-knife machines it is necessary to provide means for tightening the knife, and commonly the bearing of one of the drums has been adjustable toward and from that of the other by means of an adjusting screw. Such a construction will permit proper tightening of the knife while the machine is idle, but during the running of the machine the knife frequently becomes heated sufficiently to stretch a little so that the knife edge does not run true. According to another feature of the present invention, means are provided for yieldingly maintaining the knife taut whereby sufficient spring tension is exerted at all times upon the knife to counteract the stretching. In the illustrative machine the adjusting means includes a heavy spring through which the adjustable bearing member of one of the drums is moved, the spring being compressed so that it acts at all times during the running of the machine to maintain the knife taut.

Belt-knives are comparatively short-lived so that their removal and replacement at short intervals becomes necessary. Hitherto it has been necessary to dismantle the machine more or less in order to accomplish this. In order to do away with this necessity for taking down part of the machine, another feature of the invention relates to a construction whereby the knife may be readily removed and replaced without dismantling any part of the machine. A considerable amount of time is thus saved, and the necessity, which formerly existed, of readjusting certain of the parts is obviated.

Other features of the invention relate to improved means for supporting the knife, to improved grinding mechanism, and to certain details of construction and combinations of parts which will be described as embodied in an illustrative machine and pointed out in the appended claims.

Referring now to the accompanying drawings,—

Fig. 3 is a rear elevation of the machine without the knife guards;

Fig. 4 is a section on the line 4—4 of Fig. 3;

Fig. 5 is a vertical section on the line 5—5 of Fig. 6, showing more particularly the mounting of the rolls;

Fig. 6 is a vertical section on the line 6—6 of Fig. 5;

Figure 1:
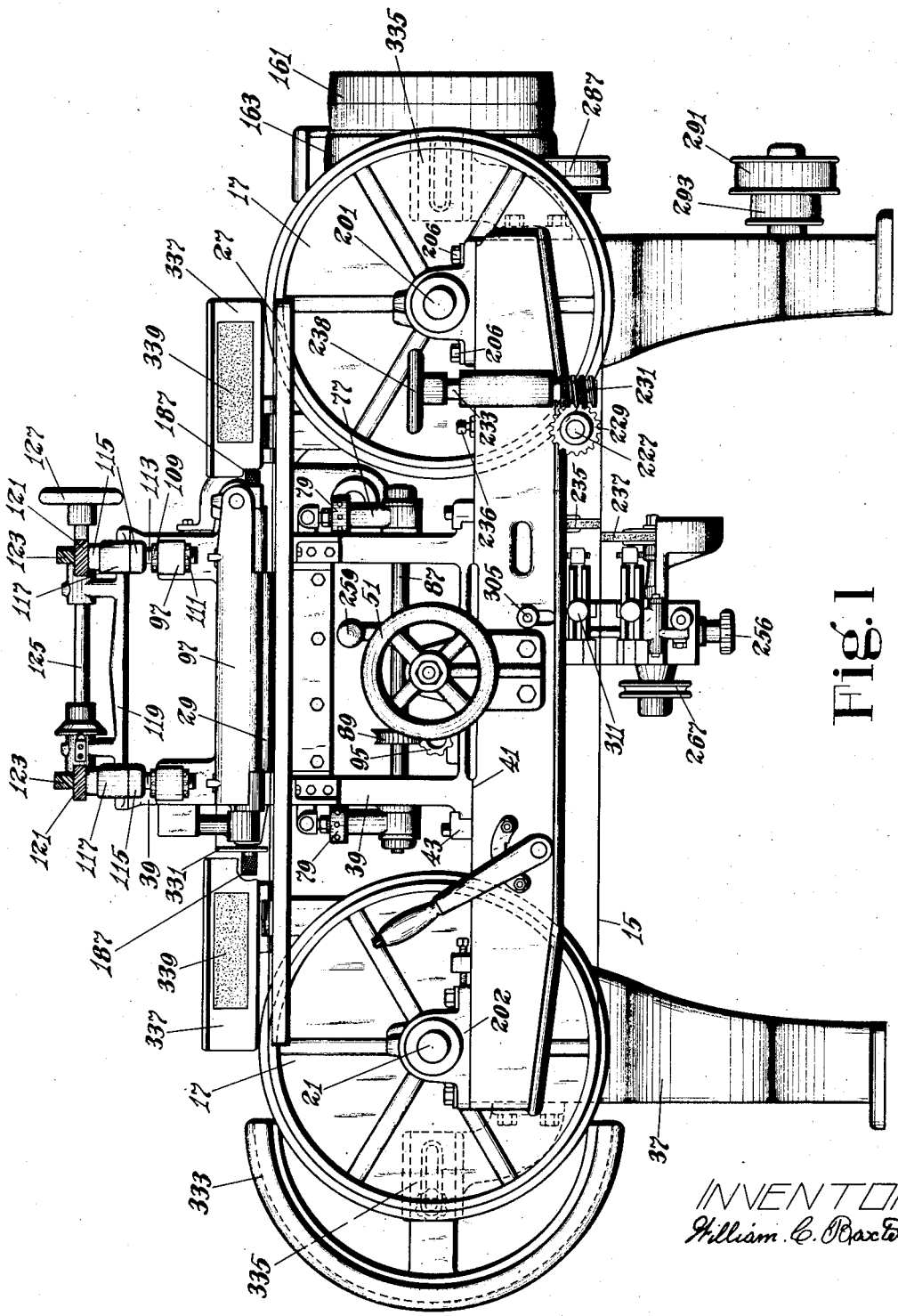
Figure 1 is a front elevation of a machine in which the present invention is embodied.

Referring more particularly to Figs. 1, 2, 3 and 5, the machine comprises a belt knife 15 which runs around two drums 17, the right-hand drum, as viewed in Fig. 3, being driven through a large bevel gear 19 which is fast to the drum-shaft 21 and a small bevel gear 23 which is fast to a shaft 25. The stock is placed upon a table 27 and fed to the upper run of the belt knife by upper and lower rolls 29, 31 mounted on shafts 33 and 35. The shafts of the drums which carry the belt knife are mounted in bearings adjustable on the frame 37 of the machine, but the bearings of the feed rolls are mounted in a head 39 which is adjustable on the frame from back to front and front to back of the machine so as to be capable of adjustment with respect to the knife.

Referring more particularly to Fig. 5, the mounting of the adjustable head 39 on the frame of the machine and that of the rolls in the head will be described. The head comprises a base having machined surfaces which rest upon similarly machined surfaces on the upper part of the frame, said surfaces coinciding in the plane indicated by the line 41. The projecting sides of the base are received under overhanging lugs formed on cleats 43 which are bolted to the frame. In order to guide the head accurately in its adjustment a strip 45, rectangular in cross-section is fastened in a groove in the frame and has a sliding fit in a registering groove in the head. A lug 47 fixed to the base of the head, is threaded to receive a screw 49 to one end of which a hand wheel 51 is fast, the shaft being held from longitudinal movement so that when the wheel 51 is turned in one direction or the other the head and with it the feed rolls, is adjusted horizontally toward or from the knife.

The upper or gage roll 29 is or may be integral with its shaft 33. The lower or feed roll comprises a plurality of individually yieldable ring-shaped sections each section being provided with internal projections 53 (Fig. 6) which enter longitudinal grooves 55 in the shaft 35. A certain amount of lost motion is permitted between these interengaging members so that the sections are individually yieldable against the tension of spring-pressed supporting rollers 57. Each of these supporting rollers is mounted between the arms of a yoke 59 the stem of which extends through a bore in a cross-bar 61. A coiled spring 63 encircles each stem and is located in a counterbore, as best shown in Fig. 6, so as to support its section of the lower roll. In order to guide the sections of the feed roll 31 in such manner that their yielding movement shall be vertical, each section is engaged at approximately its rearmost point by a scraper 64, which is adjustable by means of a screw 66 threaded into a member 65 and at a diametrically opposite point by a hardened bar 67 which is adjustably held in a member 69 by screw bolts one of which is shown at 71, the members 65 and 69 being fast to the bar 61. With the construction thus far described the sections will yield individually to variations in thickness of the stock which passes through the machine. The bearings 73 in which the shaft 35 of the feed roll is mounted carry the ends of the bar 61 and are vertically slidable in suitable guideways in the head 39, the whole feed roll structure being supported on two heavy springs one of which is shown at 75. These springs are located in casings 77 having caps 79 threaded on the upper ends thereof. Headed sleeves 81, which extend up through holes in the caps, are threaded to receive the threaded stems of members 83 to the upper ends of which the ends of the bar 61 are pivoted. The bases of the casings 77 are bored to receive eccentrics, one of which is shown at 85 fast to the ends of an adjusting shaft 87 which is rotatable in bearings in the head 39. A worm wheel 89, fast to this shaft, meshes with a worm 91 on a short shaft 93 to one end of which a hand wheel 95 is fast. With this construction, the sectional feed roll may be raised and lowered bodily by turning the hand wheel 95, and either end of the roll may be raised or lowered to line up the roll with the knife by turning one or the other of the caps 79.

The bearings of the gage roll 29 are carried by the ends of a bar 97 which is slidable upon the two uprights of the head 39, the ends of the bar being shaped as shown in Fig. 4 and held in position by gibs 99 and screw bolts 101. A support 103 having a half-round under surface to engage the upper portion of the gage roll 29 near its middle is interposed between the roll and the bar 97 and may be adjusted by turning a screw 105. In order to permit adjustment of the bar 97 vertically and with it the roll 29, the bar 97 has at its ends perforated lugs (see Figs. 1, 2 and 3). Headed sleeves 109 are threaded through the perforations and are held in adjusted position by nuts 111 which are threaded on the lower ends of the sleeves. These sleeves are also threaded internally to receive the threaded stems of adjusting screws 113 having enlarged portions 115 to receive between them perforated lugs 117 formed on a cross-bar 119 which is bolted at its ends to the tops of the uprights of the head 39. At the upper ends of the screws 113 are spiral gears 121 which mesh with spiral gears 123 at the ends of an adjusting shaft 125 having a hand wheel 127 at one end. With this construction, by turning the hand wheel, the gage roll may be raised and lowered bodily; and, by manipulating one or the other of the headed sleeves 109, one end or the other of the roll may be raised or lowered to line up the roll with the knife. It will be understood that the extent of the angular adjustment of the two rolls necessary to permit them to be properly lined up with the knife is small and that the various bearings are constructed to permit this adjustment.

Figures 2, 15:
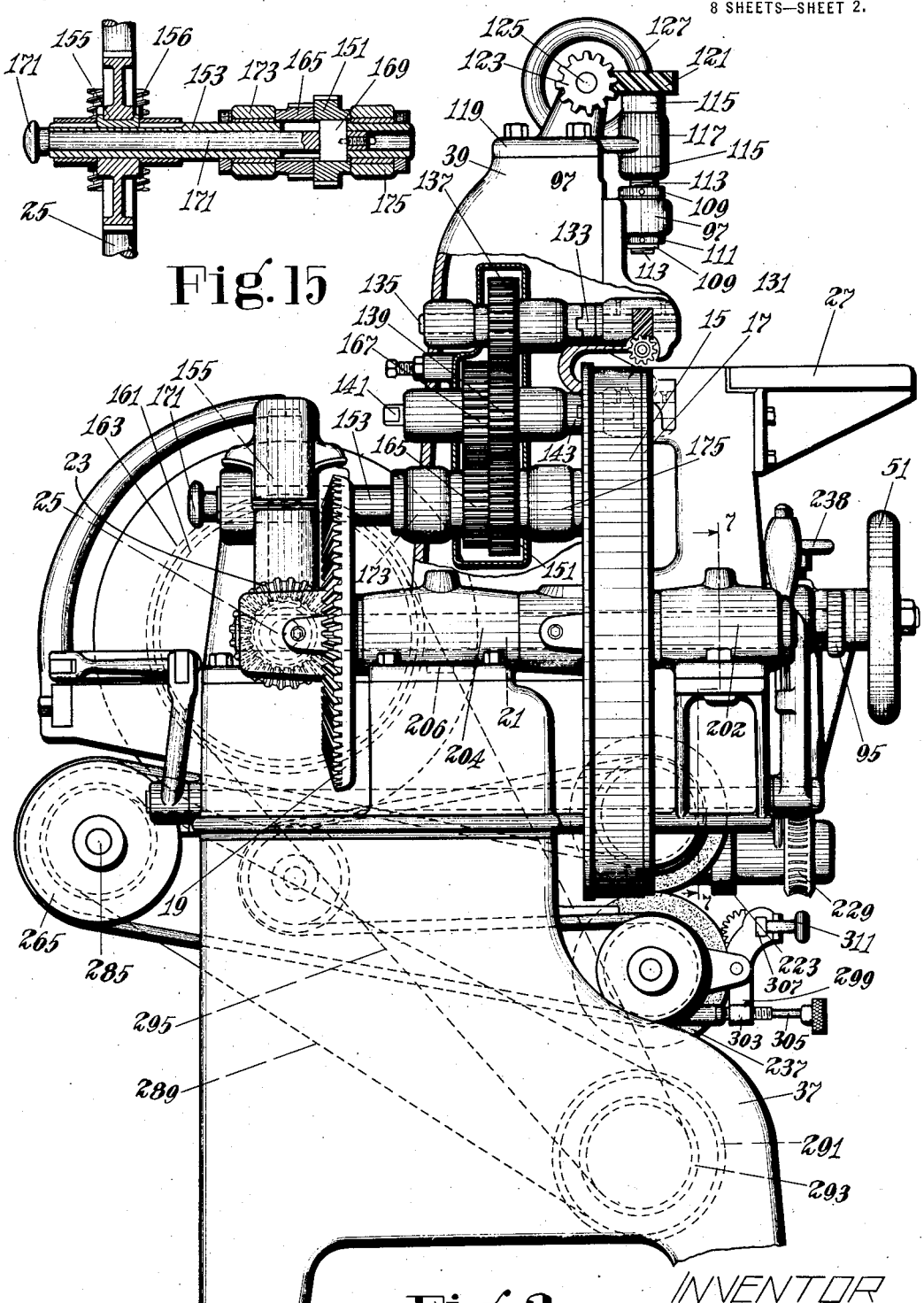
Fig. 2 is an end elevation of the machine, certain parts such as the knife guards, having been omitted.
Fig. 15 is a fragmentary section showing the sliding key change-speed mechanism.

The gage roll 29 has fast at one end a spiral gear 129 which meshes with a spiral gear 131 fast to a short shaft the bearing of which is carried by the bar 97 (see Fig. 2). This short shaft is connected by an Oldham coupling 133 with a shaft 135 the bearings of which are carried by the adjustable head 39 of the machine. The shaft 135 has fast to it a gear 137 which meshes with a gear 139 on a shaft 141 the bearings of which are carried by the adjustable head 39. This latter shaft is connected by a second Oldham coupling 143 with a short shaft 145 carried by one of the bearings 73 of the feed roll 31; and to this shaft is fast a spiral gear 147 which meshes with a spiral gear 149 on the end of the shaft 35. With this construction rotation of the shaft 141 will cause rotation of the rolls 29 and 31 to feed the stock to the knife, the Oldham couplings permitting the vertical adjustments of the rolls which have been described above.

The gear 139 meshes with a gear 151 which is keyed in a manner presently to be described to a hollow shaft 153. This shaft has slidably keyed upon it a spiral gear 155 which is held from longitudinal movement and is driven by a spiral gear 156 on the horizontal shaft 25. The shaft 25 carries the usual fast and loose pulleys 161, 163. Mounted beside the gear 151 on the hollow shaft 153 is a gear 165 which meshes with a gear 167 fast to the shaft 141. The purpose of the four gears 139, 167, 151 and 165 is to provide a change speed mechanism. Referring more particularly to Fig. 15, the gears 151, 165 have formed in their hubs keyways with either of which a key 169 on a sliding rod 171 may be caused to coöperate. In the position shown the gear 151 is keyed to the shaft 153, and this gear drives the gear 139 and consequently the gage and feed rolls of the machine. If now the rod 171 is pulled to the left, the gear 151 will be free and the gear 165 will drive the gear 167 and thereby the feed and gage rolls. In order to maintain the mesh of the gear 139 with the gear 151 and that of the gear 167 with the gear 165, the bearings 173 and 175 of the shaft 153 are fast to the adjustable head 39 and consequently, when the head is adjusted, the shaft 153 moves with it and slides through the hub of the spiral gear 155. With the driving mechanism which has been described it is possible to adjust the rolls of the machine up and down and toward and from the knife in a path parallel to the plane of the cut of the knife, as well as to change the rate of their rotation, all without disturbing the mesh of the gear train by which they are driven. When it is desired to move the rod 171 so as to change the gear ratio, the flattened end of the shaft 141 is engaged by a wrench and the shaft turned until the keyways in the gears 151, 165 are in register. They are so shown in Fig. 15, but obviously they will seldom if ever be in that position when the machine is brought to rest.

Figure 8:
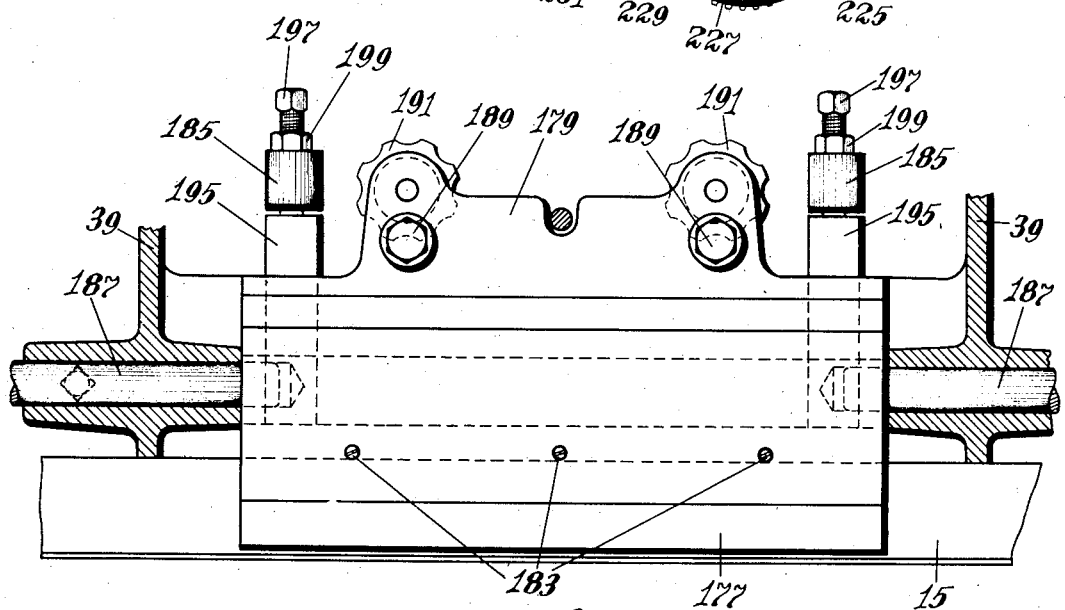
Fig. 8 is a detail in plan showing more particularly the mechanism for backing up and adjusting the belt knife.

Referring now to Figs. 6 and 8, the upper run of the belt knife 15 is guided between plates 177, 178 mounted in a rectangular groove in supporting members 179, 181, the upper plate 177 being fastened to the member 179 by a plurality of screws one of which is shown at 180. Set loosely into the plate 177 are three hardened disks, one of which is shown at 182, which serve as upper bearing members for the active portion of the upper run of the knife, said disks being adjustable by means of screws 183. The lower member 181 is rigid with the head 39. The upper member 179 is pivoted upon trunnions 187 which are carried by the head 39; and the members 179 and 181 are adjustably held together by screw bolts 189 which pass through enlarged holes in the member 179 and are threaded into the member 181 and by set screws 191 which are threaded through the member 181 and abut against the under side of the member 179. By manipulating the screws 189 and 191 the distance between the plate 177 and 178 may be varied and the screws 183 may be manipulated to cause the hardened disks 182 to bear properly upon the upper surface of the knife. With this construction, when the head 39 is adjusted toward the back of the machine, the supporting members 179, 181 and their associated parts move with it to expose more of the edge of the knife. In order to back up the operative portion of the knife and to prevent it from being moved back when the supporting members 179, 181 are so moved, there is located between the adjacent flat surfaces of these members a thin backing strip 193; and this strip is in turn backed up at each end by slidable plates 195 the forward ends of which are shouldered to overlap the backing strip 193 and the rear ends of which are engaged by the ends of screw bolts 197. These bolts are threaded through lugs formed on a standard 185, which is bolted to the frame 37 of the machine and are held in adjusted position by lock nuts 199. By manipulating these screw bolts the upper, operative run of the knife may be properly lined up and firmly supported during the cutting operation.

The purpose of the pivotal mounting of the upper member 179 and of the hardened bearing disks 182 is to provide for knives of different thicknesses and for wear of the knives. By tilting the member 179 in a clockwise direction about its pivots the forward portion of the plate 177 may be brought into contact with the upper surface of the knife, and then the hardened disks 182 may be adjusted to contact properly with the upper surface of the rear portion of the knife.

Figure 7:
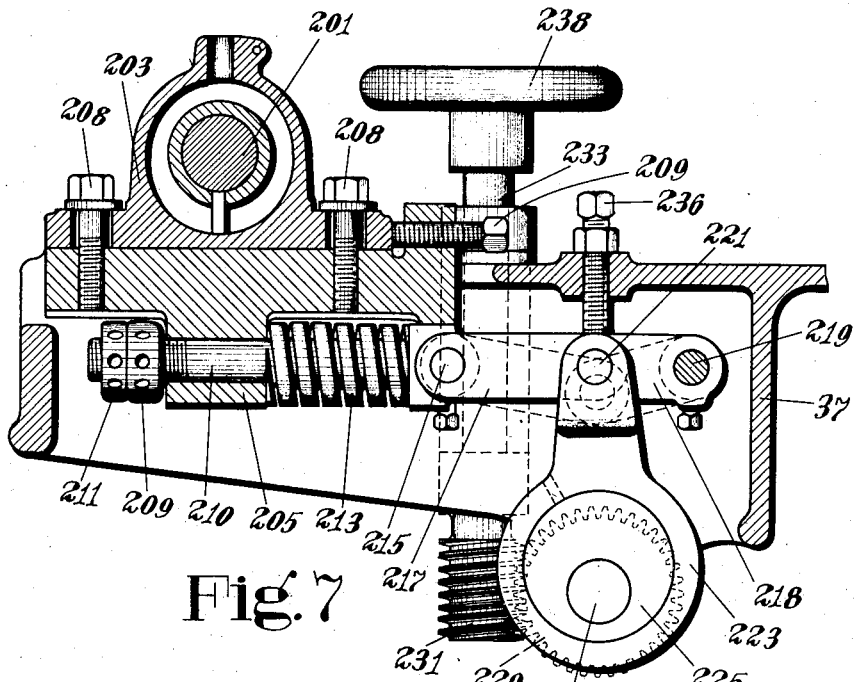
Fig. 7 is a view partly in section on the line 7—7 of Fig. 2 showing the mechanism for tightening the belt and maintaining it taut.

The shaft of the driven drum (see Fig. 2) is mounted in bearings 202, 204, the rear bearing 204 being pivoted at 206, and the front bearing being laterally adjustable to a small extent to swing the shaft 21 about the pivot. The bearings of the shaft 201 of the other drum (Fig. 7) are mounted in a similar manner, the forward bearing 203 being adjustably held in place by screw bolts 208 and the rear bearing (not shown) being pivoted as is the bearing 204 of the shaft 21 of the driven drum. An adjusting screw 209 furnishes means for adjusting the bearing 203 in the manner described above. The purpose of swinging the drum shafts angularly is to insure that the knife shall not bind on the drums, nor run off from them.

In machines of the belt knife type, the knife is placed upon the drums and then the drums are spread apart to tighten the knife and maintain it taut. It is very desirable that this tautness should be maintained, but hitherto this result has not been satisfactorily attained owing to the fact that the knife becomes heated and stretches more or less. Accordingly the knife tightening mechanism shown best in Fig. 7 has been provided. The shaft of the driven drum (the right-hand one as viewed in Fig. 3) has no adjustment other than the slight angular one which has just been described. The bearings of the shaft 201 of the other drum are mounted upon a slide 205 into which the screw-bolts 208 are threaded. The slide 205, which is slidable in suitable guideways in the frame of the machine in a direction transverse to the axes of rotation of the drums 17 has at its ends depending lugs, only one of which is shown, through which threaded rods 210 pass loosely, said rods having at one end adjusting and lock nuts 209, 211. Encircling the rods at the sides of the lugs opposite the nuts are heavy coiled springs 213. The right-hand ends of the springs abut against enlarged portions of the rods, said rods being pivotally connected by a rod 215 to one of the links 217 of toggle levers, the other links 218 being pivoted at their remote ends to a rod 219 mounted in the frame 37 of the machine. The knuckles 221 of the toggles have pivoted to them eccentric rods 223 the straps of which encircle eccentrics 225 fast upon a rotary shaft 227. This shaft has fast to it a gear 229 with which meshes a worm 231 carried at the lower end of an upright shaft 233 the upper end of which carries a handwheel 238. It will be understood that there are two rods 210, one at each end of the slide 205, two springs 213, two sets of toggles, two eccentric rods and two eccentrics. Only one each of these parts have been shown in Fig. 7, the corresponding parts being merely duplicates. In Fig. 3 a portion of one of the other eccentric and eccentric rods appear. In the position of parts shown the toggles are straightened, and the bearing is being held to the left by the force of the heavy springs 213. If now the belt knife becomes heated and stretches, the springs will maintain the knife taut. When it is desired to remove and replace a knife, the hand wheel 238 is turned to break the toggles and draw the slide 205 to the right. After the new knife has been placed about the drums, the hand wheel is turned in the opposite direction to straighten the toggles, screw bolts 236 being provided to prevent the toggles from passing dead center.

Figure 9:
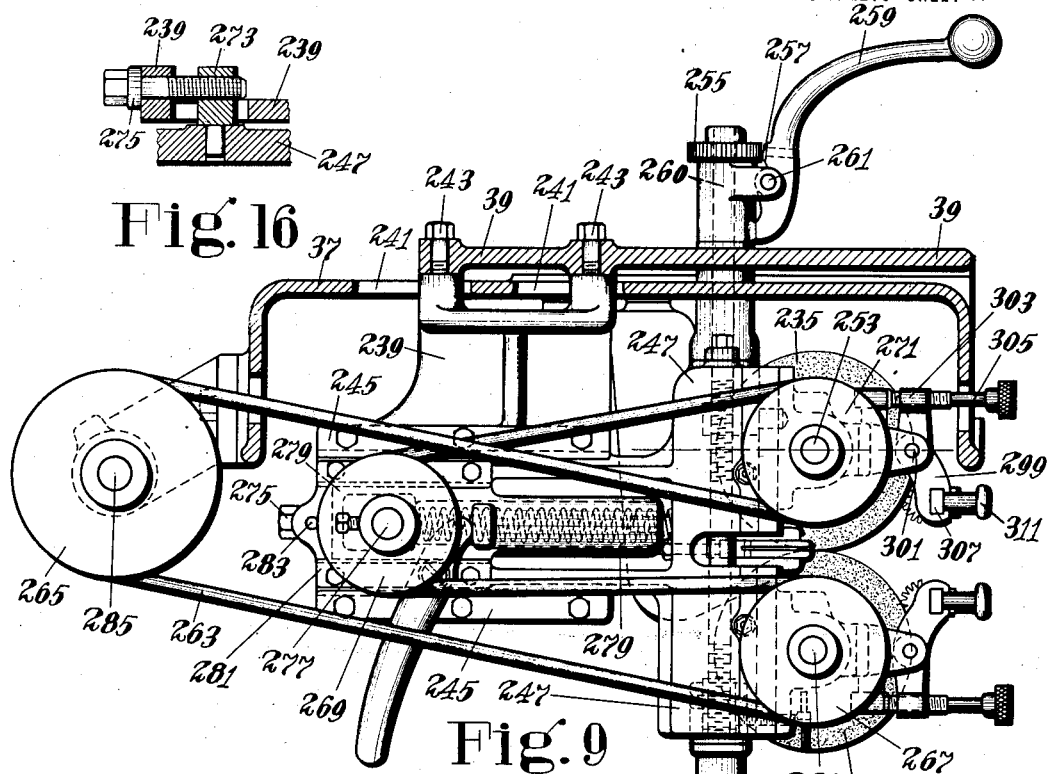
Fig. 9 is a side elevation of the knife grinding mechanism.
Figure 10:
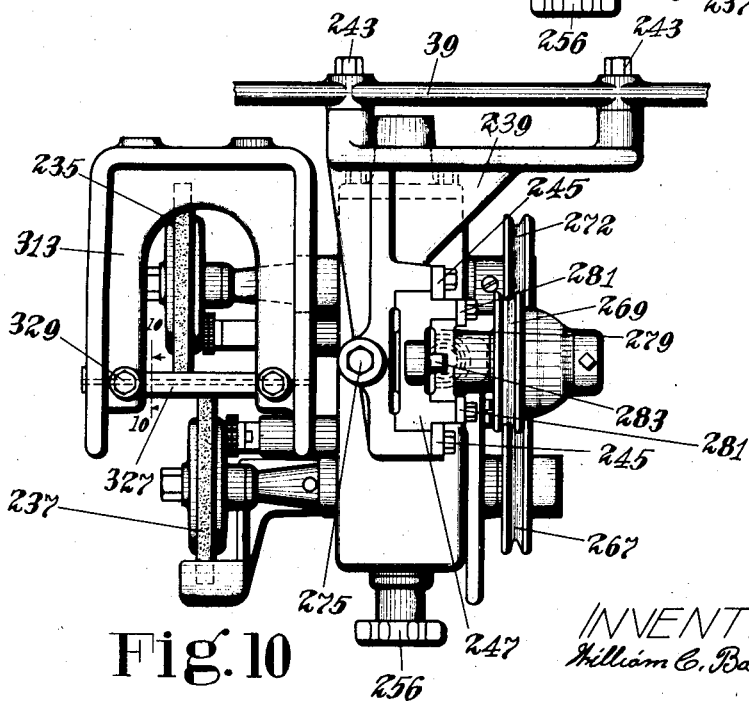
Fig. 10 is a rear elevation of the grinding mechanism.
Figure 13:
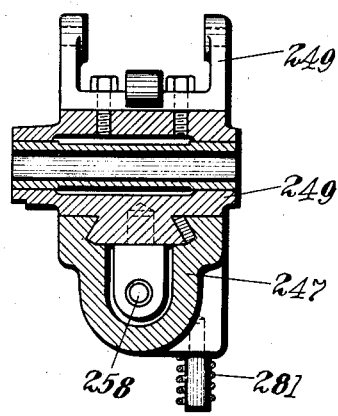
Fig. 13 is a section on the line 13—13 of Fig. 12.

Referring more particularly to Figs. 9 and 10 and somewhat to Figs. 2 and 3, the mechanism for grinding the knife will now be described. In the present machine, as has been explained above, the path of the knife is fixed, and the gage and feed rolls are adjustable toward the knife to secure the proper relation of the bite of the rolls to the edge of the knife and to compensate for the wear of the knife; and to permit such adjustment, the rolls are mounted in an adjustable head 39 while the drums which carry the knife are mounted in bearings in the frame of the machine. The grinding mechanism should be maintained in position to be applied properly to the knife at any time without any fine adjustments; and to this end the grinders 235, 237 are mounted in bearings which are carried, in a manner presently to be described, by a bracket 239, said bracket having upstanding lugs which pass up through slots 241 in the top of the frame 37 and are fastened to the base of the head 39 by screw bolts 243. Consequently, whenever the head 39 is adjusted toward or from the back of the machine to adjust the rolls with respect to the knife, the grinders move with it. The bracket 239 has formed in it a rectangular groove the sides of which are overhung by plates 245 (Fig. 10) to form a guideway in which is mounted the stem of a slide 247. This slide is generally T-shaped, the head of the T being located at the front of the machine and being U-shaped in cross-section (see Fig. 13) and provided with an undercut vertical groove in which the bearing members 249 and 251 for the rotary shafts 253 and 255 of the upper and lower grinders 235, 237 are slidable. These bearings have lugs through which a right and left screw 258 is threaded so that turning the screw in one direction or the other will move the grinders equally toward or from each other. The screw 258 passes loosely up through a perforated boss on the slide 247 and through a sleeve 260 which rests upon the boss and has at its upper end a ratchet 255. A pawl 257 is carried by a weighted lever 259 which is pivoted to the sleeve at 261, the weighted end of the lever serving as a handle. Normally the weight holds the lever in the position shown with the pawl out of engagement with the ratchet. When it is desired to turn the rod 258, for example to move the grinders into contact with the knife, the weighted end of the lever is lifted to cause the pawl to engage the ratchet, and then the lever is swung about the axis of the rod. In the use of the machine the grinders are normally out of contact with the knife; and, when it is desired to sharpen it, the lever 259 is manipulated in the manner described above. As soon as sufficient grinding has been done, the lever is manipulated to move the grinders away from the knife. The adjustment described above provides for equal and opposite adjustment of the grinders. In order to permit one grinder to be adjusted independently of the other, the bearing 251 of the lower grinder is fastened by a set screw 252 to a sleeve 254 into which the lower end of the screw 258 is threaded. Pinned to the sleeve is a hand wheel 256; and by loosening the screw 252 and turning the hand wheel the lower grinder may be raised or lowered with respect to the upper grinder. Similarly, by loosening the screw 252 and manipulating the handle 259, the upper grinder may be adjusted with respect to the lower grinder.

Figure 16:
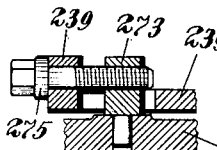
Fig. 16 is a similar section showing the means for adjusting the slide upon which the grinders are mounted.

The grinders are driven by an endless belt 263 which runs from a driving pulley 265 around a pulley 267 fast to the shaft of the lower grinder, thence around a belt tightener pulley 269, thence around a pulley 271 fast to the shaft of the upper grinder, and thence back to the driving pulley 265. In order to position the slide 247 with respect to the bracket 239 and thereby to determine the position of the grinders with respect to the knife, the horizontal portion of the slide 247 (see Fig. 16) carries a block 273 which extends into a recess in the bracket 239 and receives the threaded end of an adjusting screw 275. This screw is rotatable in but held from longitudinal movement with respect to a flange on the bracket 239. The belt tightener pulley 269 is rotatable on a stud shaft 277 carried by a slide 279 which is horizontally slidable in a suitable guideway in the main slide 247, said guideway being formed by a groove in the side of the slide 247 and plates 281 which overhang the sides of the groove. The right-hand end of the slide 279 (as viewed in Fig. 9) is hollow to receive a coiled spring which bears at one end against the base of the socket and at the other end against the slide 247 and serves to maintain the belt 263 taut. As the bracket 239 is moved back a given distance, the tightener pulley 269 moves back approximately twice as far owing to the looping of the belt 263 and at length might strike against the overhanging rear wall of the base 37. In order to prevent such an occurrence, a pin 283 set into an ear on the slide 247 extends into the path of the slide 279. The slide 247 by which the grinders are carried does not move with respect to the bracket 239 by which it is carried when the head 39 is adjusted back and forth. The purpose of this slide is to permit adjustment of the grinders with respect to the knife. By manipulating the adjusting screw 275, the grinders may be adjusted toward or from the knife to cause them to produce the proper bevel on the knife edge and to vary this bevel when desired.

The pulley 265 is fast to a shaft 285 mounted in bearings in the frame 37 of the machine, said shaft carrying at its opposite end a pulley 287. A belt 289 (Fig. 2) connects this pulley with the larger member 291 of an idle double pulley, the smaller member 293 of which is connected by a belt 295 with a pulley 297 on the driving shaft 25.

Figure 11:
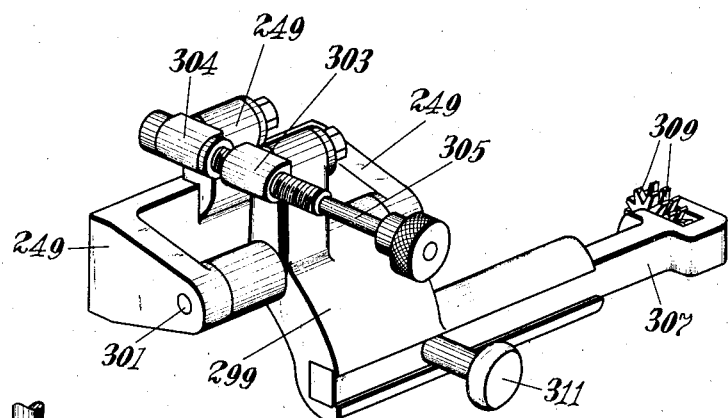
Fig. 11 is a perspective of the mechanism for dressing the grinders.
Figure 12:
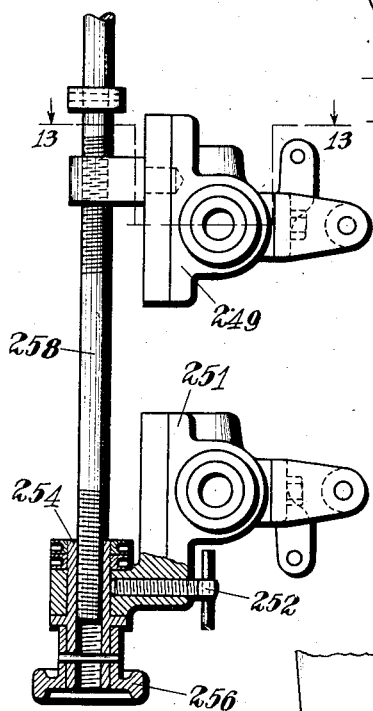
Fig. 12 is an elevation, partly in section, of the mechanism for adjusting the grinders.

In order to dress the grinders the mechanism shown in Fig. 11 is provided. Inasmuch as the dressing mechanisms for the two grinders are alike, only one of them will be described. A bracket 299 is pivoted at 301 between ears formed upon the bearing 249 of the upper grinder. This bracket has an upstanding lug at the upper end of which is pivotally mounted a threaded eye 303. A smooth-bored eye 304 is similarly carried by an upstanding lug on the bearing 249. An adjusting rod 305 the inner end of which is rotatable in but held from movement with respect to the eye 304 is threaded through the eye 303 so that by turning the screw the bracket 299 may be swung about its pivot 301. At its lower end the bracket 299 is provided with a horizontally extending slide-way in which a rectangular rod 307 is slidable, the right-hand end of the rod having rotatably mounted therein dressing burs 309 and being provided with a handle 311 by which the rod, and with it the burs, may be moved across the face of the grinder. The dressing mechanism for the lower grinder is practically the same as that for the upper grinder except that the relative positions of the adjusting screw and the dressing burs with respect to the pivot are reversed.

Figure 14:
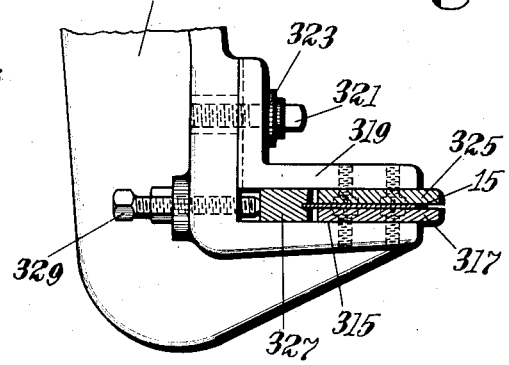
Fig. 14 is a detail, principally in elevation, showing the means for supporting the lower run of the belt knife.

In order to support the knife properly at the locality at which the grinding is done, the supporting structure best shown in Figs. 10 and 14 is provided. A bracket 313 which is bolted at its upper end to the frame 37 of the machine has two legs having substantially horizontal extensions at their lower ends. Each extension has a supporting surface 315 to which is fastened a knife supporting block 317. Angle irons 319 adjustably fastened to the legs of the bracket by screw bolts 321 and washers 323 have attached to the outer ends of their horizontal arms blocks 325 between which and the blocks 317 runs the knife 15. A bar 327 having a slot to receive the back of the knife is adjustably positioned by set screws 329 which engage opposite ends thereof.

The adjustment of the rolls 29, 31 into proper relation with respect to the cutting edge of the knife should be very carefully made in order to obtain the best results. In order to facilitate the making of this adjustment, a pointer 331, shown by dot-and-dash lines in Fig. 6 and in full lines in Fig. 1, is fastened to the head 39 by which the rolls are carried. This pointer is located in such manner that when it points directly to the edge of the knife the horizontal relation between the rolls and the knife is the proper one. As the knife wears away, the edge of the knife recedes horizontally from the tip of the pointer; and as soon as this recession is appreciable, the operator turns the hand wheel 51 to bring the pointer once more into register with the edge of the knife. In Fig. 6 are shown two chutes 333, 335 to receive respectively the finished stock and the waste material. These chutes are carried by the head 39, and the relative positions of their forward ends with respect to the feed and gage rolls therefore remain unchanged.

Referring now to Fig. 1, segmental guards 333 (only one being shown) adjustably mounted in brackets 335 by a bolt and slot connection partially encircle the drums but may be moved back into the position of the one shown when desired. In order to cover that portion of the upper run of the knife 15 which would otherwise be exposed, a pair of guards 337 (shown in their raised, inoperative positions) are hinged to the frame of the machine. These guards have mounted in them pieces of felt 339 which carry oil and serve to lubricate the knife when the guards are in their horizontal operative position. The guards have been shown in Fig. 1 in their inoperative positions in order to illustrate the ready removability of the knife from the machine. With the guards moved away from the knife, as shown, all the operator has to do in order to free the knife and provide a passage for its removal and replacement is to manipulate the hand wheel 238 so as to slacken the knife, and to manipulate the hand wheel 127 so as to separate the gage and feed rolls. When these things have been done, the knife may be pulled out from the front of the machine and replaced by a new one without dismantling any part of the machine. Of course, if the grinders are in operative position, it will be necessary to manipulate the handle 259 to separate them since the bite of the grinders, like that of the rolls, is located just in front of the edge of the knife; but inasmuch as the grinders are normally in inoperative position, no manipulation of them would ordinarily be required.

Having thus described my invention, what I claim as new and desire to secure by Letters Patent of the United States is:

1. A machine of the class described, having in combination, a belt knife, mechanism comprising upper and lower members adapted to engage both sides of the work for feeding the work to the knife, and a single adjusting member movement of which adjusts both members of the feed mechanism in a path substantially parallel to the plane of the cut of the knife.

2. A machine of the class described, having in combination, a belt knife, a pair of rolls for feeding the work to the knife, and means for adjusting the rolls in unison in a path substantially parallel to the plane of the cut of the knife.

3. A machine of the class described, having in combination, a belt knife, a pair of cylindrical rolls for feeding the work to the knife, the axes of the rolls being parallel to the edge of the knife, and means for adjusting the rolls simultaneously in a path substantially parallel to the plane of the cut of the knife.

4. A machine of the class described, having in combination, a frame, a head adjustably mounted on the frame, a belt knife supported by the frame, feed mechanism supported by the head, means for driving the knife and feed mechanism, and means whereby the head may be adjusted in a path substantially parallel to the plane in which the work is fed by the feed mechanism.

5. A machine of the class described, having in combination, a frame, a head adjustably mounted on the frame, a belt knife supported by the frame, a pair of feed rolls supported by the head, means for driving the knife and rolls, and means whereby the head may be adjusted in a path substantially parallel to the plane in which the work is fed by the rolls while maintaining the driving means operative.

6. A machine of the class described, having in combination, a frame, drums rotatably mounted on the frame and held from endwise movement with respect thereto, a belt knife carried by the drums, a head adjustably mounted on the frame, feed rolls mounted on the head, a driving shaft mounted on the frame, driving connections from the shaft to the drums and rolls, and means whereby the head may be adjusted in a direction transverse to the plane of the path of the belt knife while maintaining the driving connections operative.

7. A machine of the class described, having in combination, a frame, a head adjustably mounted on the frame, a belt knife supported by the frame, a pair of feed rolls adjustably supported by the head, means for driving the knife and rolls, means whereby the rolls may be adjusted in the head toward and from each other, and means whereby the head may be adjusted in a path substantially parallel to the plane of the cut of the knife.

8. A machine of the class described, having in combination, a frame, a head adjustably mounted on the frame, a belt knife supported by the frame, a pair of feed rolls, bearing members for the rolls adjustably mounted in the head, gears, one for each roll, rotatably supported by the bearing members and adapted to drive the rolls, a driving shaft mounted in fixed bearings, and driving connections between the gears and the driving shaft constructed and arranged to permit adjustment of the head on the frame and of the bearing members in the head.

9. A machine of the class described, having in combination, a frame, a head adjustably mounted on the frame, a belt knife supported by the frame, a pair of feed rolls, bearing members for the rolls adjustably mounted in the head, gears, on for each roll, rotatably supported by the bearing members and adapted to drive the rolls, a driving shaft mounted in fixed bearings, and driving connections between the gears and the driving shaft constructed and arranged to permit adjustment of the head backward and forward on the frame and of the bearing members up and down in the head.

10. A machine of the class described, having in combination, a frame, a head adjustably mounted on the frame, a belt knife supported by the frame, a pair of feed rolls, bearing members for the rolls adjustably mounted in the head, gears, one for each roll, rotatably supported by the bearing members and adapted to drive the rolls, a driving shaft mounted in fixed bearings, and driving connections including a change speed gearing between the gears and the driving shaft constructed and arranged to permit adjustment of the head on the frame and of the bearing members in the head.

11. A machine of the class described, having in combination, a frame, a head adjustably mounted on the frame, a belt knife supported by the frame, a pair of feed rolls, bearing members for the rolls adjustably mounted in the head, gears, one for each roll, rotatably supported by the bearing members and adapted to drive the rolls, a driving shaft mounted in fixed bearings, and a train of gears carried by the head and adjustably connecting the driving shaft with the gears.

12. A machine of the class described, having in combination, a belt knife, means for engaging the operative portion of the knife to support it with the edge of the knife projecting from the supporting means, means for feeding the work to the knife, and means whereby the supporting means may be adjusted to expose more of the edge portion of the knife, and whereby the feeding means may be adjusted in a direction substantially parallel to the plane of the cut of the knife.

13. A machine of the class described, having in combination, a belt knife, a support for the operative portion of the knife, means for feeding the work to the knife, means for driving the knife and feed mechanism, and means for simultaneously adjusting the support and feeding means in a direction substantially parallel to the plane of the cut of the knife.

14. A machine of the class described, having in combination, a frame, a head adjustably mounted on the frame, a belt knife supported by the frame, feed mechanism supported by the head, means mounted on the head for supporting the knife at the locality adjacent the feed mechanism, means for driving the knife and feed mechanism, and means for adjusting the head and with it the feed mechanism and knife support.

15. A machine of the class described, having in combination, a belt knife means for feeding the work to the knife, means for grinding the knife, and means whereby the feeding means and the grinding means may be adjusted together in a direction substantially parallel to the plane of the cut of the knife.

16. A machine of the class described, having in combination, a frame, a head adjustably mounted on the frame, a belt knife supported by the frame, feed mechanism supported by the head, grinding mechanism for the knife also supported by the head, means for driving the knife, feed mechanism and grinding mechanism, and means for adjusting the head in a path substantially parallel to the plane of the cut of the knife.

17. A machine of the class described, having in combination, a frame, a head adjustably mounted on the frame, a belt knife supported by the frame, a pair of feed rolls supported by the head, grinding mechanism for the knife also supported by the head, means for driving the knife, rolls and grinding mechanism, and means for adjusting the head in a path substantially parallel to the plane of the cut of the knife.

18. A machine of the class described, having in combination, a frame, a head adjustably mounted on the frame, a belt knife supported by the frame, a pair of feed rolls supported by the head, grinding mechanism for the knife also supported by the head, means for driving the knife, rolls and grinding mechanism, and means for adjusting the head in a path substantially parallel to the plane of the cut of the knife while maintaining the driving means operative.

19. A machine of the class described, having in combination, a belt knife, feed rolls for advancing the work to the knife, means for adjusting the rolls in a direction substantially parallel to the plane of the cut of the knife to bring the rolls into proper position with respect to the edge of the knife, and means for visually indicating to the operator when the most advantageous relative position of the knife and rolls has been reached.

20. A machine of the class described, having in combination, a belt knife, feed rolls for advancing the work to the knife, means for adjusting the rolls in a direction substantially parallel to the plane of the cut of the knife to bring the rolls into proper position with respect to the edge of the knife, and a pointer movable with the rolls and located to indicate when the proper adjustment has been made.

21. A machine of the class described, having in combination, a belt knife, drums upon which the knife is mounted, bearing members for the drums, and means for yieldingly spreading the bearing members apart whereby spring tension is exerted upon the knife at all times to maintain it taut.

22. A machine of the class described, having in combination, a belt knife, drums upon which the knife is mounted, bearing members for the drums, one of which is adjustable toward and from the other, and means including a spring for moving the adjustable bearing member away from the other bearing member.

23. A machine of the class described, having in combination, a belt knife, drums upon which the knife is mounted, an adjustable bearing member for one of the drums, an adjusting member connected with the frame of the machine, and a spring located between the adjusting member and the adjustable bearing.

24. A machine of the class described, having in combination, a belt knife, drums upon which the knife is mounted, an adjustable bearing member for one of the drums, a toggle connected with the frame of the machine, and a spring located between the toggle and the bearing member to receive the thrust of the toggle and transmit it to said member.

25. A machine of the class described, having in combination, a belt knife, drums over which the knife runs, adjustable guards for the knife, means for tightening and slackening the knife, separable feed rolls the bite of the rolls being located in front of the edge of the knife, and a feed table located in front of the knife and entirely below the operative run thereof, there being provided at the front of the machine an unobstructed space such that, when the guards have been adjusted away from the drums and the rolls separated, the knife may be removed and replaced without dismantling any part of the machine.

26. A machine of the class described, having in combination, a belt knife, means for driving the knife, means for feeding work to the knife, and a support for the operative run of the knife, said support comprising a rigid member for engaging one side of the knife, a pivoted adjustable member for engaging the other side of the knife, and means for holding the last-named member in adjusted position.

27. A machine of the class described, having in combination, a belt knife, means for driving the knife, means for feeding work to the knife, and a support for the operative run of the knife, said support comprising a rigid member located on one side of the operative run of the knife, an adjustable member located on the other side and a plurality of hardened knife contacting members adjustably mounted in the adjustable member.

28. A machine of the class described, having in combination, a frame, a head adjustably mounted on the frame, a belt knife, drums by which the knife is carried, said drums being mounted in bearings on the frame, a pair of feed rolls mounted in bearings in the head, means whereby the head may be adjusted in a path substantially parallel to the plane in which the work is fed by the rolls, a member rigid with the head and adapted to engage the under side of the operative run of the knife to support it, a second member adjustable with respect to the head and adapted to engage the upper side of the knife, and means whereby the last-named member may be adjusted toward and from the knife.

29. A machine of the class described, having in combination, a frame, a head adjustably mounted on the frame, a belt knife, drums by which the knife is carried, said drums being mounted in bearings on the frame, a pair of feed rolls mounted in bearings in the head, means whereby the head may be adjusted in a path substantially parallel to the plane in which the work is fed by the rolls, a member rigid with the head and adapted to engage the under side of the operative run of the knife to support it, a second member pivoted to the head and adapted to engage the upper side of the knife, and means whereby the last-named member may be adjusted about its pivotal axis.

30. A machine of the class described, having in combination, a belt knife, means for engaging the knife on opposite sides to support it with the edge of the knife projecting from the supporting means, and means whereby the supporting means may be adjusted to expose more of the edge portion of the knife.

31. A machine of the class described, having in combination, a belt knife, means for feeding the work to the knife, means for operating the knife, and yielding means for maintaining the knife taut.

32. A machine of the class described, having in combination, a belt knife, means for feeding stock thereto, and means for grinding the knife, said last-named means comprising a pair of grinding wheels arranged to engage respectively opposite sides of the knife, means for adjusting the wheels in unison toward and from the knife, and means whereby either wheel may be adjusted independently of the other.

33. A machine of the class described, having in combination, a belt knife, means for feeding stock thereto, and means for grinding the knife, said last-named means comprising a pair of grinding wheels arranged to engage respectively opposite sides of the knife, dressing tools mounted adjacent to the grinding wheels, and means whereby the tools may be moved into operative relation to the wheels.

34. A machine of the class described, having in combination, a belt knife, means for feeding stock thereto, and means for grinding the knife, said last-named means comprising a pair of grinding wheels arranged to engage respectively opposite sides of the knife, dressing tools adjustably mounted adjacent to the grinding wheels, means whereby the tools may be adjusted with respect to the wheels, and means whereby the tools may be moved into operative relation to the wheels.

In testimony whereof I have signed my name to this specification.

WILLIAM C. BAXTER.